US008654103B2

(12) United States Patent
Ilmonen

(10) Patent No.: US 8,654,103 B2
(45) Date of Patent: Feb. 18, 2014

(54) INTERACTIVE DISPLAY

(75) Inventor: Tommi Ilmonen, Espoo (FI)

(73) Assignee: Multitouch Oy, Helsinki (FI)

( * ) Notice: Subject to any disclaimer, the term of this patent is extended or adjusted under 35 U.S.C. 154(b) by 134 days.

(21) Appl. No.: 13/503,526

(22) PCT Filed: Feb. 9, 2010

(86) PCT No.: PCT/FI2010/050082
§ 371 (c)(1),
(2), (4) Date: Apr. 23, 2012

(87) PCT Pub. No.: WO2011/098654
PCT Pub. Date: Aug. 18, 2011

(65) Prior Publication Data
US 2012/0206416 A1      Aug. 16, 2012

(51) Int. Cl.
*G06F 3/042* (2006.01)
(52) U.S. Cl.
USPC .......................................... 345/175; 345/173
(58) Field of Classification Search
USPC .......................................... 345/156, 173–179
See application file for complete search history.

(56) References Cited

U.S. PATENT DOCUMENTS

| 6,339,748 | B1 | 1/2002 | Hiramatsu |
| 2001/0012001 | A1 | 8/2001 | Rekimoto et al. |
| 2005/0178953 | A1 | 8/2005 | Worthington et al. |
| 2008/0062123 | A1 | 3/2008 | Bell |
| 2008/0074401 | A1 | 3/2008 | Chung et al. |
| 2011/0227876 | A1 | 9/2011 | Ilmonen |

OTHER PUBLICATIONS

ACM publication "ThinSight: Integrated Optical Multi-touch Sensing through Thin Form-factor Displays" by Izadi et al.
U.S. Appl. No. 12/876,192 Titled "Automatic orientation of items on a touch screen display utilizing hand direction" to Ilmonen, filed Sep. 7, 2010.

Primary Examiner — Ricardo L Osorio
(74) Attorney, Agent, or Firm — Shalom Wertsberger; Saltamar Innovations

(57) ABSTRACT

An interactive display device (100) presents to a user (113) a visible image on an image layer (102) through a touching surface (101). The display device (100) has an illumination unit (107) that transmits infrared light and captures through the touching surface sets of infrared images of objects that are in the proximity of the touching surface. The display device (100) detects from the infrared images contact areas where a pointing object (112) is located with respect to the image layer (102) and casts in the infrared image a corresponding shadow. The illumination unit (107) alternates the infrared illumination so that each infrared image set has images taken with differing infrared illumination. Resulting variance in the shadows is used by the interactive display device (100) to detect whether the pointing object (112) contacts the touching surface (101) or not.

20 Claims, 3 Drawing Sheets

INTERACTIVE DISPLAY

FIELD OF THE INVENTION

The present invention generally relates to an interactive display.

BACKGROUND OF THE INVENTION

There are interactive displays which comprise a projector or a Liquid Crystal Display panel to form an image on a surface, a camera behind the surface and computer vision circuitry for detecting user input.

US 2001/0012001 A1 discloses one such display system. This system comprises a semi-transparent screen and an infrared LED (light emitting diode) panel, a CCD (charge coupled device) camera and a projector provided on the back side of the semitransparent screen. The camera operates on infrared wavelengths and detects infrared light reflected from objects on the other side of the semitransparent screen, when the objects are relatively close to the screen or when they touch the screen. The projector projects visible image light onto the screen. Infrared component of the image projected by the projector may be filtered out. Thereby the projected image does not disturb the camera.

ACM publication "ThinSight: Integrated Optical Multitouch Sensing through Thin Form-factor Displays" by Izadi et al. discloses another type of interactive displays.

In this publication individual infrared emitter/detector pairs placed behind backlight of an LCD (liquid crystal display) display are used to detect objects on or in the vicinity of the LCD display, the LCD display thus operating as an interactive display. The use of an LCD display may overcome many of the problems of the projector-based interactive screens. The disclosed technology however requires number of infrared emitter/detector pairs to be mounted on the system, if input is to be detected on a larger area, whereby production of such interactive displays is laborious and thus high costs may be involved.

In the absence of ambient IR light, the display may illuminate objects on or near its surface by means of IR illumination, but it is very difficult to counter excessive ambient IR illumination. Detecting an object on the surface of the display with an IR camera is complicated by the presence of sunshine or other strongly IR-emitting illuminators such as halogen lamps. Namely, in this case the infrared-emission that the system produces may not be strong enough to cause near-by objects to appear as highlights. For instance, one known technology for detecting a finger touching the display surface is to detect when an image of the finger becomes crisp. A diffusive screen is attached onto the display surface so that a touching finger blocks IR light from being diffused by the diffusive screen under the finger and a relatively sharp shadow is formed conforming to the shape of the contact. However, under strong, coherent light such as sunshine, any object casts a sharp shadow on the camera even from a distance. Hence, it may be impossible to detect a contact simply from the sharpness of the shadow. Moreover, under strong ambient IR light the camera signal may be flushed with measured light such that it is generally impossible or at least very difficult to distinguish any meaningful picture.

US20080062123A1 discloses an interactive video display system. According to the abstract, the system uses strobing light to allow easy and unencumbered interaction between a person and projected video images. A camera may be synchronized to the strobing light and the strobing light may be in an infrared spectral range. A processing system detects images of a human in the field of view of the camera and controls the display so that the projected video images are changed based on an interaction between the human and the projected video images. The system may project the video images on a surface around the person and may move the projected video images on the surface based on a movement of the person. The projected video images may include computer-generated characters and/or virtual objects that react to the movement of a person.

U.S. Pat. No. 6,339,748B1 discloses in its abstract an object to provide a coordinate input system imparting a coordinate input function onto a transmissive screen for image display such as a rear projecting display apparatus, which permits use of a ray reflecting indicator smaller in size and lighter in weight than a light pen and to improve easiness to use. The coordinate input system of the invention has an infrared ray source 3 which projects an infrared ray onto the back surface of the transmissive screen 2 for image display, a CCD camera 4 which covers the back surface of the transmissive screen as a senses range, and an image information processing circuit 5 which generates coordinate information of a ray reflecting indicator 1 located in front of the transmissive screen 2, from output image information of the CCD camera.

It is an object of the present invention to avoid problems associated with prior art and/or to provide an alternative to existing technology.

SUMMARY

According to a first aspect of the invention there is provided an interactive display device comprising:

- an image layer configured to provide a user with a perceivable visible image according to an electronic signal;
- a touching surface covering the image layer or formed by the image layer;
- an image capture unit configured to obtain, in a particular invisible frequency range at a given image set capture rate, successive sets of captured images representative objects in the proximity of the image layer;
- a processor configured to detect from the captured images contact areas where a pointing object contacts the touching surface and thus causes correspondingly a set of marks in the captured images;
- an illumination unit configured to illuminate in the invisible frequency range the contact areas with blinking illumination at a strobe rate that is less or equal to the image set capture rate;
- the processor being further configured to detect the contact areas by identifying matching sets of marks from captured images of an image set based on:
  - differences in luminosity of the marks of matching sets of marks of successive captured images; and
  - information regarding the blinking illumination.

The image layer may be configured to pass through light with the invisible frequency range.

Each of the marks may appear as a shadow or highlight.

The image capture unit may be configured to obtain through the image layer the captured images. Alternatively, the image capture unit may be formed on the image layer or in front of the image layer such that the images produced by the image layer are visible to the user through the image capture unit.

The image set capture rate may equal to the strobe rate.

The image set may comprise two or more images. The two or more images of the image set may be taken with intervals equal to intervals between successively taken images of two adjacent image sets. Alternatively, the two or more images may be taken in a burst such that the intervals between the images of an image set are substantially shorter than the period of time over which the set of images is taken divided by the number of the images. The two or more images may be taken in the burst by using two or more cameras. Alternatively, the two or more images may be taken by a high-speed camera.

Advantageously, by taking the images in a burst, it may be possible to reduce changes between successive images of the set caused by any one of: the motion of the pointing object with relation to the image layer; changes in ambient illumination; and changes in electromagnetic interference within the display device.

The image set capture rate may be between 20 to 60 image sets per second. The image set capture rate may be, for instance, 30 or 60 image sets per second.

The information regarding the blinking illumination may comprise knowledge of the amount of the illumination during capturing of each one of the successive captured images. This information may comprise knowledge of the intensity and timing of the blinking illumination in relation to the times during which the recognizing unit has obtained the captured images.

The illumination unit may be configured to illuminate the pointing object so that a first captured image out of the set of images is illuminated by the illumination unit with a first power. A second captured image out of the set of images may be illuminated by the illumination unit with a second power that is substantially different from the first power so that the second captured image is illuminated by the illumination unit differently than the first captured image. A third captured image out of the set of images may be illuminated by the illumination unit with a third power that is smaller than one and greater than another of the first and second power. The first power may correspond to a nominal power of the illumination unit. The second power may be substantially zero. The third power may be substantially average of the first power and of the second power.

According to a second aspect of the invention there is provided a method in an interactive display device, comprising:

provide a user by an image layer with a perceivable visible image according to an electronic signal, wherein a touching surface covers the image layer or is formed by the image layer;

obtaining, by an image capture unit, in a particular invisible frequency range at a given image set capture rate, successive sets of captured images representative objects in the proximity of the image layer;

detecting from the captured images contact areas where a pointing object contacts the touching surface and thus causes correspondingly a set of marks in the captured images;

illuminating in the invisible frequency range the contact areas with blinking illumination at a strobe rate that at most the image set capture rate;

detecting the contact areas by identifying matching sets of marks from captured images of an image set based on:
differences in luminosity of the marks of matching sets of marks of successive captured images; and
information regarding the blinking illumination.

According to a third aspect of the invention there is provided a computer program configured to cause when executed by a computer a method according to the second aspect of the invention.

According to a fourth aspect of the invention there is provided a computer readable memory medium embodied with a computer program which when executed by a computer causes a computer to perform a method according to the first aspect of the invention.

Various embodiments of the present invention have been illustrated only with reference to certain aspects of the invention. It should be appreciated that corresponding embodiments may apply to other aspects and embodiments as well to produce further non-limiting examples.

BRIEF DESCRIPTION OF THE DRAWINGS

The invention will be described, by way of example only, with reference to the accompanying drawings, in which.

DETAILED DESCRIPTION

In the following description, like numbers denote like elements.

In the following examples of various embodiments of the invention an LCD screen is used as an example of an image layer. The LCD screen may comprise a film that forms a visible image and optionally also other elements such as background illumination, infrared (IR) illumination, incoming IR intensity detection across the screen, and/or one or more speakers for outputting sound. It is appreciated that the invention may likewise be applied with any other types of image layers as well, or screens for simpler expression. Generally, an image layer is any means for producing a visible image for a user, such as an electric display, a screen displaying a projected image or a substance carrying printed, dyed image, or woven image. However, the image layer should be sufficiently transparent or translucent for IR light that is used for detecting a pointing object through the image layer as will be explained in more detail in the following.

Figure 1:
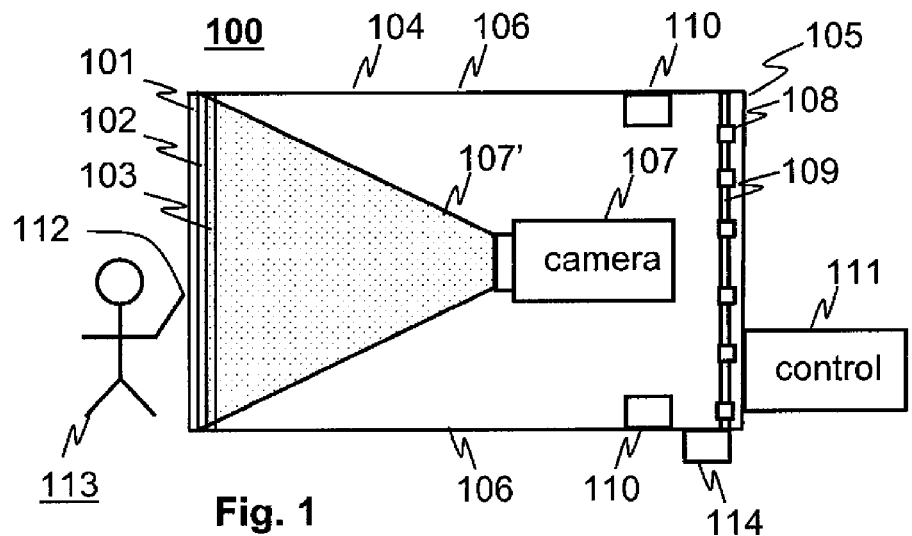
FIG. 1 shows a block diagram of a system according to an embodiment of the invention.

FIG. 1 shows a block diagram of a system 100 according to an embodiment of the invention. FIG. 1 also shows a user 113 for facilitating the description of particular order of different elements. The system 100 is suited for use as an interactive user interface device e.g. as a built in dynamic menu in a restaurant, as a display screen at a ticket office, or generally wherever an interactive display and optical pointing recognition is desired.

The system 100 comprises as an outmost element or as facing to the user 113 a touching surface 101 such as a toughened glass plate, then an LCD film 102 as a display screen and a diffusion layer 103 behind the screen. Preferably, the touching surface, the screen 102 and the diffusion layer 103 are all in a compact stack such that the distance from the touching surface to the diffusion layer is as low as possible for machine view performance reasons that will be described in more detail in this description.

The purpose of the diffusion layer 103 is to spread the light coming from a background light source (described in the following), so that an image displayed on the screen appears even from many directions. This spreading can be achieved with a diffusion film or with a holographic rear-projection film. By placing the diffusion layer 103 behind the screen 102, significant advantages may be achieved in comparison to placing the diffusion layer 103 in front of the screen 102 or to omitting the diffusion layer 103. Namely, the diffusion layer 103 reducing reflections from the typically glossy backside of the screen 102, which reflections may interfere with the recognizing of pointing objects. It is also advantageous to locate the diffusion layer 103 behind the screen 102 when seen by a user 113, because otherwise it provides an additional reflecting surface between the screen 102 and the viewer thus impairing the image quality or contrast especially.

In order to support the aforementioned optical elements, there is provided a casing 104. The casing 104 comprises a back wall 105 attached to side walls 106. The side walls are attached from one end to the back wall 105 and from their opposite ends to the touching surface 101, screen 102 and diffusion layer 103. A background light source 108 may be located in the casing 104 for background illumination of the screen 102. The background light source 108 may comprise, for example, one or more of: LED light, light conductor, fluorescent light, and luminescence light.

In an alternative embodiment, the diffusion layer 103 is omitted. This may particularly be the case when an evenly illuminating background light is provided by a luminescence light that in itself provides an even field of illumination on the LCD film 102.

The side walls 106 may be coated from the inner side with some reflective material in order to deliver maximum amount of light to the screen and finally to users of the system. By means of the reflective side walls one may avoid or at least reduce shadows that may be caused to the background light in the IR image captured by a camera behind the screen 102. The reflective side walls may also help in delivering the background light to the screen in a way that the light can be spread to the users without allowing users to see details inside the system through the screen and at the same time improving the viewing angle of the system. In addition to the reflective side walls (or reflective casing) the diffusion layer 103 may help to achieve this effect. More particularly, the side walls may be for example mirror walls, in which case a particularly good consistency of an image on the image layer may be achieved.

Inside the casing, there is an image capture unit 107 that is in this particular case an IR camera configured to see through the diffusion layer 103, screen 102 and the touching surface 101 any objects placed near or at the touching surface 101. Further in FIG. 1, there is drawn as a dotted area an IR light reception space 107' for the IR camera. The camera is configured to detect signals that are outside the visible light wavelengths. There may be for example a filter in front of the lens of the camera providing this effect. The camera may be based on for example CCD (charge-coupled device) or CMOS (complementary metal-oxide-semiconductor) technology. Moreover, the image capture unit 107 may comprise more than one camera e.g. for better resolution, for smaller distance between the screen and the cameras, or for covering larger LCD screens 102.

The distance between the background light source 108 and the diffusion layer 103 may generally depend on the space that the camera setup requires. The distance may be shortened for more compact sized system e.g. by moving the camera forward and/or turning the camera around (to point away from the screen) and using a mirror or prism in front of the camera to capture the activities on the screen.

Alternatively, the image capture unit 107 may be formed of a planar sensing structure that has a number of sensors spread over a plane to recognize intensity of incoming light through each pixel or pixel block of the screen 102. Such a structure may also double as a visible light and/or IR illumination behind the screen 102 for the purpose of background illuminating the LCD screen and/or illuminating objects in front of the LCD screen under weak ambient IR illumination. In case of a planar sensing structure operating as an image capture unit 107, there is no IR light reception space 107' as that drawn in FIG. 1 but instead there is merely a small parallel space between the screen and the image capture unit. Further, the image capture unit may be integrated directly into the image plane, for example the screen.

The camera 107 and the IR LEDs 110 may not be seen from the outside of the system if their shadow is negligible e.g. due to the highly diffused illumination coming from the background lights and as the reflective inner side of the system provides evens further illumination of the display surface. Further, the diffusion layer 103 may prevent the users from seeing any details from inside the system.

A camera as the IR image capture unit typically provides a more economical solution than a plurality of emitter/detector pairs that are typically used in a planar illumination and sensing element. First, the area covered by one camera typically requires a relatively high number of emitter/detector pairs thus incurring a relatively high number of components and wires. Second, production of the system may be simpler when a camera is used. On the other hand, by using emitter/detector pairs in a planar image capture unit, the size of the system may be reduced and there is no need for accurately positioning and directing the camera in a desired angle with regard to the screen 102.

The system 100 may further comprise an IR reflection inhibitor 109 configured to reduce reflection of IR light from the back wall and again from any elements in front of the camera 107. The IR reflection inhibitor 109 may comprise, for instance, a black plate such as a sooted aluminum plate placed around the background light source 108 or behind the background light source 108. Alternatively, the IR reflection inhibitor 109 may comprise additionally or alternatively a selective screen between the background light source 108 and the IR light reception space 107'.

Additionally the system 100 may comprise invisible light sources 110 such as IR light sources for facilitating input detection on IR wavelengths. The invisible light sources may comprise for example IR LEDs placed outside the angle of view of the image capture unit. In case that a camera is used as the image capture unit, the invisible light sources 110 may be located outside a cone formed by the view area of the camera. On the other hand, if a planar image capture unit behind or integrated with the LCD screen is used, the LCD screen itself may be configured to provide the IR illumination across its view area or the IR illumination may be configured to be produced such that it illuminates objects at the LCD screen without first passing through the LCD screen.

The system 100 may further comprise an audio speaker 114 for providing audible signals to the user 113. The system may be configured to e.g. provide a tapping sound to indicate determined tapping on the touching surface 101 for enhancing user experience of an operable system and to teach users that there is no need for applying substantial force against the touching surface when the recognition of the pointing object 112 is optically performed.

Figure 2:
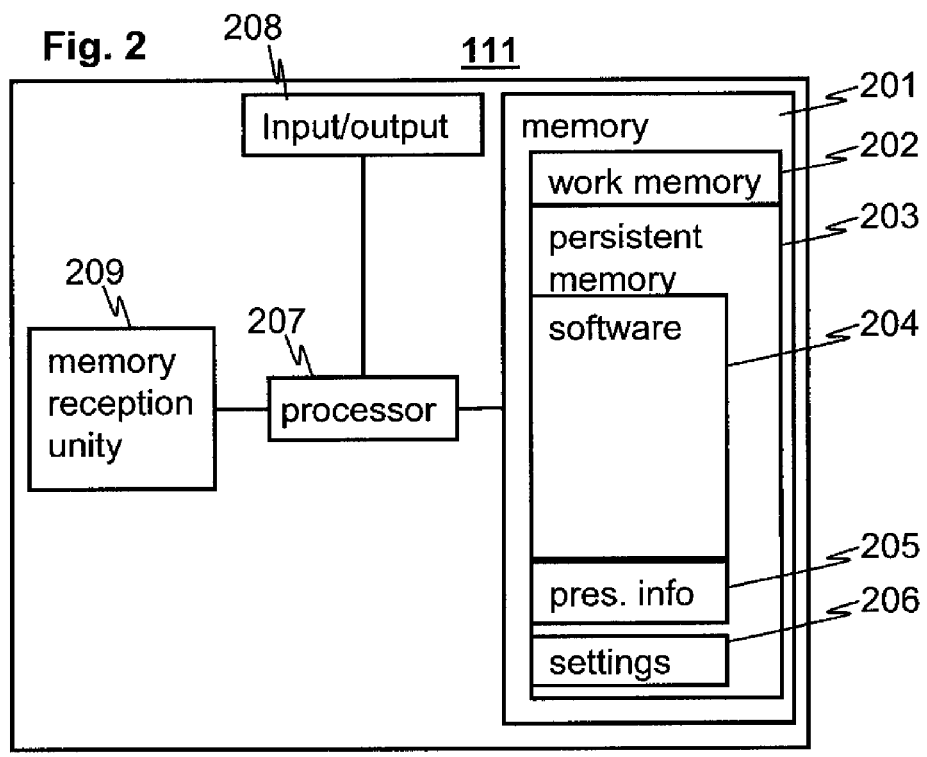
FIG. 2 shows a simplified block diagram of the structure of a control unit shown in FIG. 1 according to an embodiment of the invention.

FIG. 2 shows a simplified block diagram of the structure of the control unit 111. The control unit 111 may be based on, for example, a general purpose computer supplied with suitable software and/or on a particularly adapted computing device. While it is possible to implement the control unit 111 by purely hardware based a device, typically it is more economic and faster to produce by making use of software.

In FIG. 2, the control unit 111 is drawn to comprise a memory 201 that comprises a work memory 202, a non-volatile memory 203 that is configured to store software 204, presentation information 205 describing content to be presented by the system 100 and/or how pointing at different areas on the screen should be treated, and settings 206 needed e.g. for manual or automatic calibration of the system 100. The software 204 may comprise any one or more of the following items: operating system, device drivers, display presentation application, hypertext markup language parser, image processing software, and drivers for different external equipment that may be connected to the system such as printers, further displays, further interactive systems 100, audio systems, and external IR illumination equipment (not shown).

The control unit 111 further comprises a processor 207 configured to control the operation of the control unit 111 according to the software 204 by executing computer executable program code contained by the software in the work memory 202. Alternatively, the control unit may be configured to execute the software in place in the non-volatile memory in which case the work memory may not be necessary. The control unit further comprises an input/output unit (I/O) 208 for exchanging signals with other elements of the system 100 and optionally also with external equipment. The I/O 208 may comprise e.g. any one or more of a universal serial bus port, a local area network port, an ISA bus, a PCI express port, an IR port, a Bluetooth element, and a parallel port. Alternatively to being configured capable of communicating with external equipment, the system 100 may be provided with a transferable memory reception unit 209 such as a cd-rom or dvd-rom drive, memory card reader or memory stick reader which enables replacing part of the non-volatile memory e.g. for updating information to be displayed on the LCD screen 102.

In order to control the operation of various components of the system and to obtain the captured image, there are connections between the control unit or particularly its input/output unit 208 and other components of the system 100, while not shown in sake of clarity of the drawing. The control unit has generally the task of receiving a signal from the camera 107, detecting if and where the touching surface 101 is pointed at and typically also outputting the determination in a standard way e.g. emulating a computer drawing tablet, mouse or other known pointing device.

Generally, the control unit operation may comprise following acts:
controlling the screen to show desired images to the user 113
controlling the IR lights 110 to produce IR light on demand for showing a pointing object 112 such as a user's 113 finger when brought close to the screen
obtaining signals corresponding to received IR light from the image capture unit 107
detecting from the received signals the pointing object at the touching surface 101
performing a predefined action based on the detected input, e.g. changing the image displayed on the screen 102 or following a hyperlink associated with the area at which the pointing object is detected
detecting the amount of ambient IR light controlling the IR lights 110 accordingly It is appreciated that while the control unit may consist of one separate unit, the control unit 111 may alternatively be integrated with any other element or comprise two or more discreet elements each for one or more of the aforementioned acts.

Figure 3:
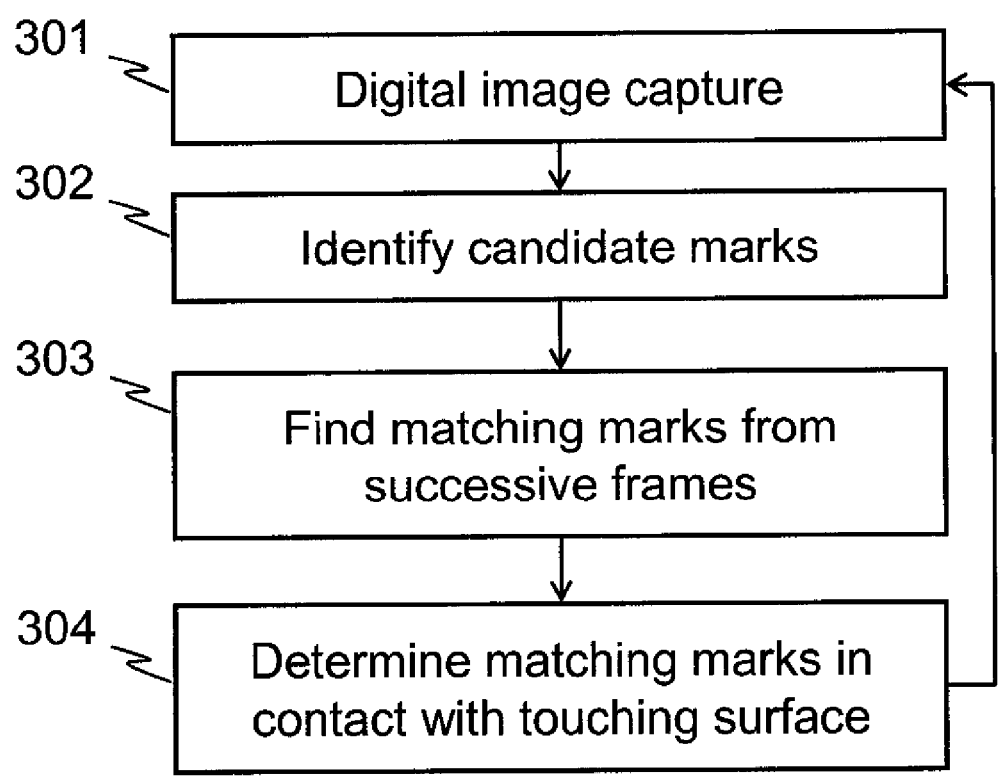
FIG. 3 shows a schematic flow chart according to an embodiment of the invention for illustrating a first phase in a process of determining a pointing object from an Infrared (IR) image captured by an IR image capture unit from behind of the pointing object under clear daylight or strong and relatively coherent ambient IR light.

FIG. 3 shows a schematic flow chart according to an embodiment of the invention for illustrating a process of determining a pointing object from an IR image captured by an IR image capture unit 107. In the process finger tips of a user are searched as an example of a typical pointing object 112 at the touching surface 101 by the control unit 111. It is appreciated that a user may rest her hand or at least more than one finger on the touching surface 101 so that many different highlights or shadows of varying sharpness may be produced and detected as being pointed depending on the implementation.

The process starts 301 when the camera operates and also typically the screen 102 is presenting some still or motion picture to the user 113 and the control unit receives a digitized IR image from the camera or from an analogue-digital converter (possibly comprised by the control unit) in case that the image capture unit 107 has an analogue output. The digital IR image comprises a set of pixels typically such that the area corresponding to the touching surface 101 is divided into a matrix of x columns and y rows. In the matrix, each cell represents one pixel with a value that is typically of 8 bits depth i.e. has 256 different numerical values representative of the IR luminosity detected by the image capture unit for that cell.

Next, in step 302 candidate marks are identified in the IR image. These marks may be determined based on luminosity difference of a given threshold, luminosity reaching a given absolute threshold, luminosity gradient of a mark meeting given criterion or criteria, the size of the mark meeting given criterion or criteria, and/or the shape of the mark meeting given criterion or criteria.

In step 303 it is then checked from a subsequent frame whether the candidate marks are found indicative of a possible movement of the pointing object on the touching surface. It is appreciated that in normal use, a hand of the user may move by a substantial amount in comparison to the size of different selectable regions on the display. Hence, it is normal that e.g. the marks of two fingers and of the palm have moved between two subsequent frames.

In one embodiment, the matching of marks in subsequent frames is checked by testing different offsets and computing corresponding cost functions. For instance, let us assume that there are five candidate marks within a typical distance from each other (when a hand is used as a pointing object). In the next frame, five candidate marks are again found, but not in identical positions. It is then tested to shift all the candidate marks of the first frame so as to locate the first candidate mark $C(1,1)$ of the first frame onto the first candidate mark $C(1,2)$ of the second frame. In this case, the first candidate mark has a perfect correspondence between two frames, but each of the four other candidate marks $C(n,1); n=2 \ldots 5$ of the first frame have some difference by their locations in comparison to the second frame. An absolute value is taken from each difference and the absolute values are summed up to form a cost factor. Similarly, cost factors are computed for four remaining tests i.e. that the first candidate mark of the first frame is located onto a second candidate mark, third candidate mark, fourth candidate mark and on the fifth candidate mark of the next frame. The lowest cost factor then indicates the matching marks i.e. marks of the next frame which correspond to the marks of the first frame.

The matching embodiment is but one simple example. Of course, the best matching offset may be such where none of the candidate marks quite fits to the location of the next frame. Any prior known methods may be used to identify the matching marks.

In an embodiment of the invention, the invisible illumination with the invisible light source 110 is performed in a blinking fashion or with a strobe light such that during every Nth IR image capture time the invisible light source 110 is on, while the invisible illumination is off or on a reduced intensity during IR image capture time of other IR images. Accordingly, the marks in subsequent frames may have differing appearance. For instance, it may be that at some part of the IR image, an arbitrary frame here denoted as frame j has two marks, both appearing as highlights as the reflection from the pointing object exceeds ambient illumination. In subsequent frame j+1 the invisible light source 110 is off and the marks appear as shadows. In one embodiment, frame j+1 is illuminated with the invisible light source 110 with intermediate power which by coincidence causes reflection from the pointing object with an intensity that substantially matches with that of the ambient IR light. Hence, no marks appear in frame j+1. However, frames j and j+2 (with IR light 110 off) then appear. Such apparently missing marks may be interpolated based on the visible marks in frames j and j+2.

It is also possible that different marks corresponding to a common moving pointing object (e.g. corresponding to different fingers) may appear differently due to indirect source of the invisible light and to the limited capability of the diffusion layer 103 to refract that light. For instance, the ambient invisible light intensity may be far stronger than the light produced by the invisible light source 110, but fall steeply to a fraction of one hundredth part of the top intensity in the camera image.

In this case, the bright ambient invisible light (e.g. light from the sun) becomes far weaker than the light produced by the invisible light source 110 when moving farther apart from a direct line to the source of such a very bright ambient light. The matching process may be configured to account for uneven ambient light intensity.

In step 304 it is checked whether and which of the candidate marks likely correspond to a contacting pointing object. It is computed based on the differences of the luminosities of the matching marks of successive frames and based on the information about the blinking i.e. when and how intensively the invisible light source 110 has operated.

It is appreciated that the blinking of the invisible light source 110 may enable automatically adapting to different ambient light conditions. It was already mentioned that the ambient light may cause uneven illumination in the invisible light frequency range. It may then easily happen that on contact, the pointing object is not distinguishable from the background of the frame when the invisible light source 110 is on or off, but the blinking makes it possible to detect the mark of the pointing object in at least half the frames.

The blinking is also advantageous in that it enables detecting of so-called marker sheets that may be placed in contact with the touching surface and used to configure the camera system and/or to feed information to the system. The marker may comprise, for instance, bar codes.

The blinking also automatically adapts to very differing ambient light conditions. For instance, the system 100 may be placed under a strong halogen lamp, which may be suddenly turned on or off. In very strong and focused light, the pointing object casts very sharp and deep shadows. The invisible light source 110 may then produce a clearly distinguishable increase in the luminosity at the center of such a shadow when the pointing object comes to a contact with the touching surface and reflects to the camera light from the invisible light source 110.

It is also appreciated, that two successive frames are not compared pixel-to-pixel, but instead candidate marks are identified and compared. In other words, the comparison of adjacent of successive frames in an embodiment of the invention does not necessarily compare the same region of the frames. Thus, the comparison may produce far sharper a result than direct frame-to-frame comparison when the pointing object moves along the touching surface.

Figure 4:
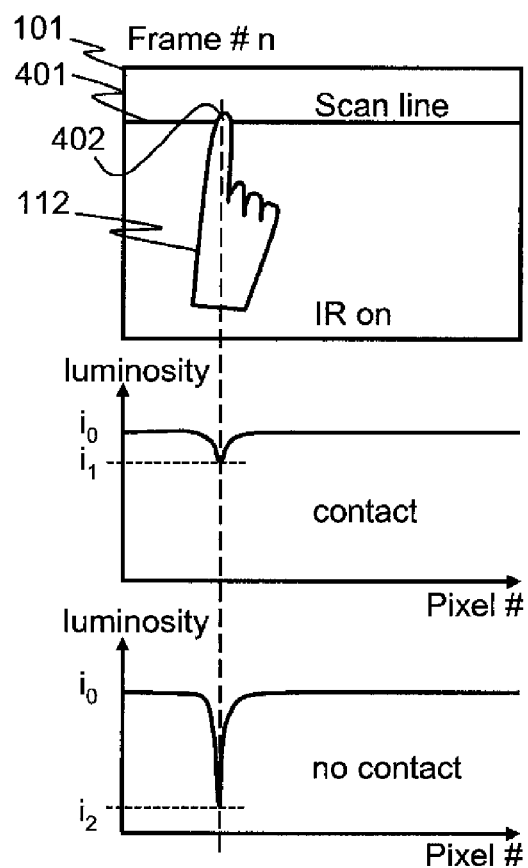
FIG. 4 shows a schematic presentation of a pointing object on a display and resulting mark in captured images depending on whether the pointing object touches the display or not, when infrared illumination is switched on, according to an embodiment of the invention.
Figure 5:
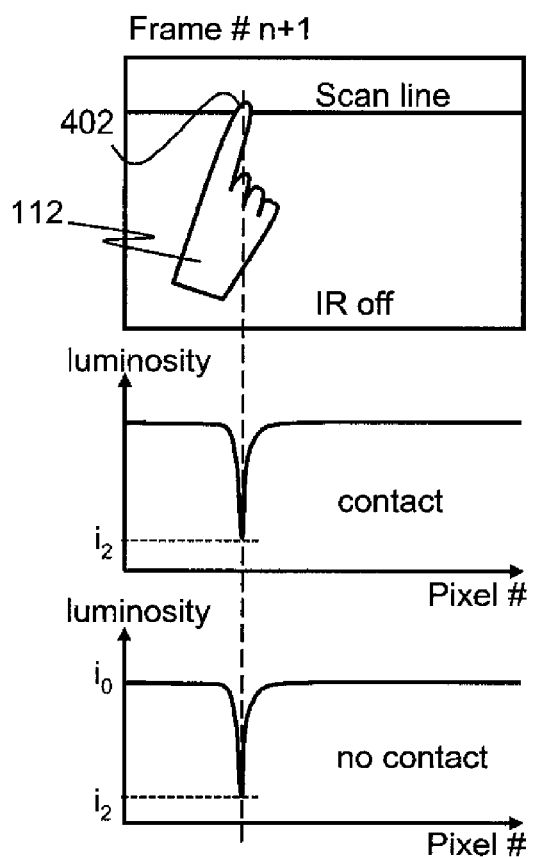
FIG. 5 shows a schematic presentation of a pointing object on a display and resulting mark in captured images depending on whether the pointing object touches the display or not, when infrared illumination is switched off, according to an embodiment of the invention.

FIG. 4 shows a schematic presentation of a pointing object on a display and resulting mark in captured images depending on whether the pointing object touches the display or not, when infrared illumination is switched on, according to an embodiment of the invention. FIG. 5 shows a schematic presentation of a pointing object on a display and resulting mark in captured images depending on whether the pointing object touches the display or not, when infrared illumination is switched off, according to an embodiment of the invention.

It is illustrating to compare FIGS. 4 and 5 and within these two Figs. The graphs for the two different scenarios, i.e. for the pointing object contacts the touching surface 101 and that the pointing object is further away (e.g. 10 cm apart) from the touching surface. It is appreciated that the operation of the system 100 greatly depends on the ambient illumination. In this case, it is assumed that there is relatively strong and non-diffuse light source, say a single halogen light that causes strong shadows. Let us then consider FIG. 4. When the invisible illumination (e.g. IR light) is on, a contacting finger tip 402 (or other pointing object) reflects light into the image capture unit 107 (shown in FIG. 1) and reduces the shadow that is caused by the finger to the ambient light in the invisible frequency range. At the finger tip, a scan line 401 in the captured image n experiences a slight dip from level $l_0$ to level $l_1$. On the other hand, when the finger tip 402 is not contacting the touching surface 101, the finger reflects far insignificant amount of light to the image capture unit 107 and the luminosity on the scan line drops down to level $l_2$. Now, a clear shadow is seen by the image capture unit 107. It is remarkable that even if the strong ambient light may prevent or interfere with recognizing contact of the pointing object, the change in reflectance may enable clear detection of the contact from the difference of intensities $l_1$ and $l_2$.

In contrast with FIG. 4, FIG. 5 illustrates frame n+1 that is captured without illumination with invisible light. Here, whether the finger touches the touching surface 101 or not, the finger tip causes a similar drop in the luminosity along the scan line 401. Hence, it is very difficult to determine whether the finger actually touches the screen or is still, for instance, 10 cm or more apart from the touching surface 101.

It is also appreciated that if images are captured in sets of varying illumination intensity, the contact areas will appear in correspondingly varying luminosity. Hence, some images of a set of images may mark the contact with dips of varying depth, while some other images of the set may mark the contact with a hump and sometimes reflecting light may compensate the shadow of the pointing object such that there appears to be no dip or hump, either. It is also appreciated that if the ambient light cannot be controlled, the level of ambient light in the imaging frequency range and the intensity of the invisible illumination determine whether and how large dips or humps result from a contact. As was explained in the foregoing, the use of varying intensities in the invisible illumination should yet ensure that there will be at least one image in each set of images where the contact is recognizable regardless of the intensity of the ambient light intensity in the imaging frequency range.

In one embodiment of the invention, the intensity of the invisible illumination is controlled based on the measured ambient light intensity in the imaging frequency range. The measurement of the ambient light intensity may be carried out using the luminosity in background pixels of the images. The ambient light measurement may be particularly carried out from images taken without invisible illumination. The invisible illumination may be adjusted to a level in which the pointing object should be clearly determinable taking in to account the normal properties of the pointing object, properties of the image capturing unit algorithms used to detect the contact areas, and/or desire to reduce energy consumption.

It should be appreciated that in this document, words comprise, include and contain are each used as open-ended expressions with no intended exclusivity. Moreover, term light here is interchangeable with radiation. While infrared light has in occasions been used, this terming is merely for convenience of explanation the term light is not intended to imply suitability for perception by means of a human eye.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An interactive display device comprising:
   an image layer configured to provide a user with a perceivable visible image according to an electronic signal;
   a touching surface covering the image layer or formed by the image layer;
   an image capture unit configured to obtain, in a particular invisible frequency range and at a given image set capture rate, successive sets of captured images representative objects in the proximity of the image layer;
   a processor configured to detect from the captured images contact areas where a pointing object contacts the touching surface and thus causes correspondingly a set of marks in the captured images;
   an illumination unit configured to illuminate in the invisible frequency range the contact areas with blinking illumination at a strobe rate that is less or equal to the image set capture rate;
   the processor being further configured to detect the contact areas by identifying matching sets of marks from captured images of an image set based on:
      differences in luminosity of the marks of matching sets of marks of successive captured images; and
      information regarding the blinking illumination.

2. The interactive display device of claim 1, wherein the image layer is configured to pass through light with the invisible frequency range.

3. The interactive display device of claim 1, wherein each of the marks appears as a shadow or highlight.

4. The interactive display device of claim 2, wherein the marks comprise a shadow or a highlight.

5. The interactive display device of a claim 1, wherein the image capture unit is configured to obtain the captured images through the image layer.

6. The interactive display device of a claim 2, wherein the image capture unit is configured to obtain the captured images through the image layer.

7. The interactive display device of claim 1, wherein the image capture unit is formed on the image layer or in front of the image layer such that the images produced by the image layer are visible to the user through the image capture unit.

8. The interactive display device of claim 7, wherein the image capture unit is formed on the image layer or in front of the image layer such that the images produced by the image layer are visible to the user through the image capture unit.

9. The interactive display device of claim 1, wherein the image set capture rate equals to the strobe rate.

10. The interactive display device of claim 1, wherein the image set comprises two or more images.

11. The interactive display device of claim 9, wherein the image set comprises two or more images.

12. The interactive display device of claim 10, wherein image capture unit is configured to take the two or more images of the image set in a burst.

13. The interactive display device of claim 1, wherein the information regarding the blinking illumination comprises knowledge of the amount of the illumination during capturing of each one of the successive captured images.

14. The interactive display device of claim 12, wherein the information regarding the blinking illumination comprises knowledge of the amount of the illumination during capturing of each one of the successive captured images.

15. The interactive display device of claim 1, wherein the illumination unit is configured to illuminate the pointing object so that:
   a first captured image out of the set of images is illuminated by the illumination unit with a first power;
   a second captured image out of the set of images is illuminated by the illumination unit with a second power that is substantially different from the first power;
   a third captured image out of the set of images is illuminated by the illumination unit with a third power that is smaller than one and greater than another of the first and second power.

16. A method in an interactive display device, comprising:
   providing a user with a perceivable visible image according to an electronic signal on an image layer, wherein a touching surface covers the image layer or is formed by the image layer;
   obtaining at a given image set capture rate and in a particular invisible frequency range successive sets of captured images representative objects in the proximity of the image layer;
   detecting from the captured images contact areas where a pointing object contacts the touching surface and thus causes correspondingly a set of marks in the captured images;

illuminating in the invisible frequency range the contact areas with blinking illumination at a strobe rate that at is less or equal to the image set capture rate;

detecting the contact areas by identifying matching sets of marks from captured images of an image set based on:
differences in luminosity of the marks of matching sets of marks of successive captured images; and
information regarding the blinking illumination.

17. The method of claim 16, wherein the image set comprises two or more images and the method further comprises taking the two or more images of the image set in a burst.

18. The method of claim 16, wherein by obtaining the captured images through the image layer.

19. The method of claim 16, wherein the image set capture rate equals to the strobe rate.

20. The method of claim 16, wherein the information regarding the blinking illumination comprises knowledge of the amount of the illumination during capturing of each one of the successive captured.

* * * * *